UNITED STATES PATENT OFFICE.

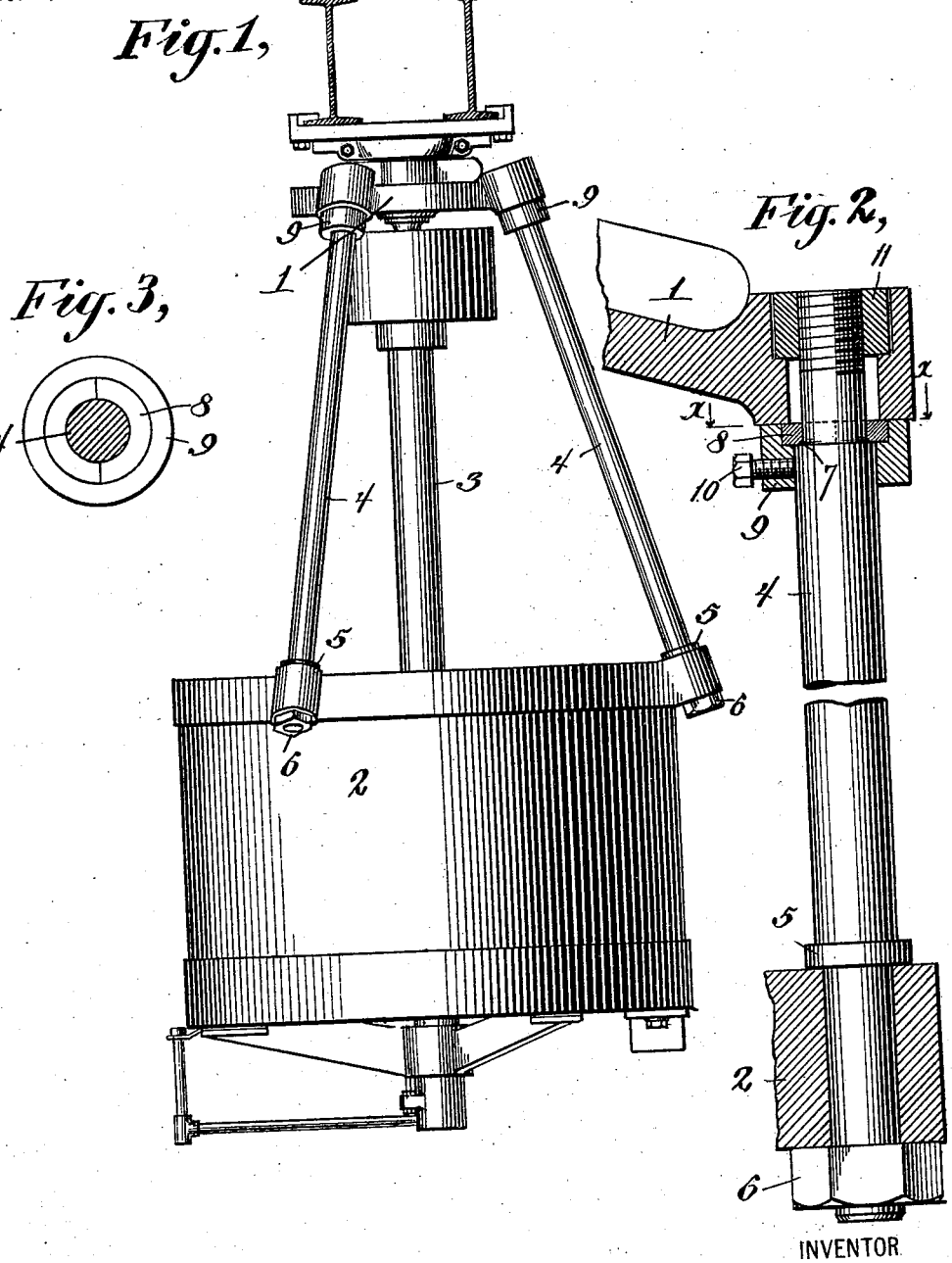

GODFREY ENGEL, OF BALTIMORE, MARYLAND.

DEVICE FOR SECURING RODS OR SHAFTS IN PLACE AND FOR PERMITTING READY REMOVAL OF SAME.

SPECIFICATION forming part of Letters Patent No. 692,997, dated February 11, 1902.

Application filed September 1, 1900. Serial No. 28,853. (No model.)

*To all whom it may concern:*

Be it known that I, GODFREY ENGEL, a citizen of the United States, residing at Baltimore, State of Maryland, have invented certain new and useful Improvements in Devices for Securing Rods or Shafts in Place and for Permitting Ready Removal of the Same; and I do hereby declare the following to be a full, clear, and exact description of the invention, such as will enable others skilled in the art to which it appertains to make and use the same.

My invention relates to improvements in devices for securing rods or shafts in place and for permitting ready removal of the same. It is particularly intended for use in securing to the supporting-head of a suspension centrifugal machine the rods by which the main portion of the machine is suspended from such head.

My invention consists in the novel means employed for holding a rod or shaft in place.

The object of my invention is to provide an improved and simple holding device for rods, shafts, and the like which will hold such rod or shaft firmly and yet permit the same to be dismounted readily when desired. This object is attained in the invention herein described, and illustrated in the drawings which accompany and form a part of this specification, in which the same reference-numerals indicate the same or corresponding parts, and in which—

Figure 1 is an elevation of a centrifugal machine of the suspension type, the suspension-rods of which are secured to the suspension-head in accordance with my invention. Fig. 2 is a detail view showing the holding device in section, and Fig. 3 is a transverse section on the line $x\,x$ of Fig. 2.

In the drawings, 1 is an ordinary suspension-head of a centrifugal machine, 2 the curb thereof, and 3 the revolving shaft thereof.

4 4 are suspension-rods, by which the curb 2 and the shaft 3 and its connected parts are suspended from the head 1. Near its lower end each rod is provided with a flange 5 and at its lower end with a nut 6, which nut serves to clamp the curb 2 against such flange 5.

It has been customary in the past to connect suspension-rods of centrifugal machines to the curbs in the manner shown at the lower end of Fig. 2, and it has also been customary to connect such rods to the suspension-head 1 in a similar manner. When the parts are so connected, it is a matter of considerable difficulty to remove any one of the rods or to dismount the curb. To avoid this difficulty, I provide each rod 4 near its upper end with a shoulder 7. The aperture in the head 1 through which the rod passes is considerably larger than that portion of the shaft above the shoulder 7 and is sufficiently large to permit the passage of such shoulder. Just above the shoulder 7 is a split ring 8. (Shown in detail in Fig. 3.) The external diameter of this ring is greater than the diameter of the said aperture in the head 1. The sections of such split ring are held together when said ring is in place by a retaining-ring 9, mounted upon the rod 4, and having a recess to receive the ring 8 and normally held in place by a set-screw 10. At the upper end of each rod 4 is a nut 11, bearing against the head 1. In the construction shown said nut 11 is countersunk into the head 1.

To remove one of the rods 4, the nut 6 upon its lower end is removed, the retaining-ring 9 is dropped by loosening its set-screw, and the split ring 8 is removed, which may be done readily by simply separating its parts. The rod 4 may then be raised vertically to an extent sufficien tto disengage it from the curb 2 and to permit the removal of the nut 11. It may then be withdrawn from the head 1. By a reverse operation the rod may be replaced in the machine.

Having thus completely described my invention, what I claim, and desire to secure by Letters Patent, is—

1. The combination, with a rod having a shoulder, an object to which said rod may be connected, having an aperture through which said shoulder may pass, and means for so connecting said rod to said object, of a split ring, surrounding said rod, and having an internal diameter less than that of the shoulder and an external diameter greater than that of the said aperture, and means for holding the sections of said ring together normally.

2. The combination, with a rod having a shoulder, an object to which said rod may be connected, having an aperture through which said shoulder may pass, and means for so connecting said rod to said object, of a split ring, surrounding said rod, and having an internal diameter less than that of the shoulder and an external diameter greater than that of said aperture, and a retaining-ring for holding the sections of said split ring together normally.

3. In a centrifugal machine, the combination, with a suspension-head and a curb, of rods for suspending said curb from said suspension-head, passing through the curb and having limiting-flanges and means for holding the curb against said flanges, the outer ends of said rods passing through the suspension-head and being provided with means for connecting said rods to said head and with shoulders beneath such head, the said suspension-head having apertures, for the passage of such rods, which apertures are larger than the shoulders of said rods directly beneath said head, split rings on said rods interposed between said head and the shoulders of said rods, and means for holding the sections of said rings together normally.

4. In a centrifugal machine, the combination, with a suspension-head and a curb, of rods for suspending said curb from said suspension-head, passing through the curb and having limiting-flanges and means for holding the curbs against said flanges, the outer ends of said rods passing through the suspension-head and being provided with means for connecting said rods to said head and with shoulders beneath such head, the said suspension-head having apertures, for the passage of such rods, which apertures are larger than the shoulders of said rods directly beneath said head, split rings on said rod interposed between said head and the shoulders of said rods, and retaining-rings for holding the sections of said rings normally together.

In testimony whereof I affix my signature in the presence of two witnesses.

GODFREY ENGEL.

Witnesses:
PHIL. L. McELHANY,
NATHAN BRADLEY.